Patented Dec. 14, 1948

2,455,910

UNITED STATES PATENT OFFICE 2,455,910

METHOD FOR CURING ETHYLENE POLYMERS

Witty Lysle Alderson, Jr., Wilmington, Del., assignor to E. I. du Pont de Nemours & Company, Wilmington, Del., a corporation of Delaware No Drawing. Application February 20, 1945, Serial No. 578,939

10 Claims. (Cl. 260—23)

This invention relates to polymeric materials, and more particularly to polymers of ethylene.

This invention has as an object an improved method for curing, that is insolubilizing and raising the softening point, of the essentially saturated ethylene polymers which are normally soluble in organic solvents. Other objects will appear as the description proceeds.

These objects are accomplished by a process, more particularly described hereinafter, which comprises blending the above mentioned ethylene polymer with a monocarboxylic acid containing at least 4 carbon atoms and with an inorganic peroxy compound of the kind described hereinafter, and then heating the blend at a temperature of at least 100° C. until the polymer becomes insoluble in organic solvents in which it was originally soluble.

The ethylene polymers used in the practice of this invention are those obtained by polymerizing ethylene either alone or admixed with minor amounts of other ethylenically unsaturated compounds in accordance with the procedure described in United States Patents Nos. 2,153,553 and 2,200,429, and the halogenated ethylene polymers are prepared as described in United States Patents Nos. 2,183,556 and 2,213,786. The polymers and interpolymers of ethylene can also be made by conducting the polymerization under the action of heat and pressure in the presence of water and a peroxy compound.

In the practice of the present invention the above mentioned ethylene polymers are blended, preferably by milling on rolls heated from 100° C. to 120° C., with a monocarboxylic acid containing at least 4 carbon atoms, and with an inorganic peroxy compound which can be one of the known basic peroxide hydrates or a perhydrate of a salt obtained from the acids of boron or of the elements of the fourth group of the periodic system. Because of their availability and effectiveness, the preferred basic peroxide hydrates are those of zinc and cadmium. Of the perhydrated salts, sodium percarbonate is preferred, since it is readily obtained and is highly effective.

The best results are obtained by first blending the monocarboxylic acid with the polymer before adding the peroxy compound. Although this order can be reversed, the acid and peroxy compound cannot be mixed prior to their addition to the polymer.

The invention is further illustrated by the following examples, in which the parts are by weight:

Example I

To 100 parts of a solid ethylene polymer, having a molecular weight of about 15,000, heated on rolls maintained at 100° to 110° C. is added 10 parts of stearic acid dissolved in 100 parts of xylene. As soon as the mixture is homogeneous a paste consisting of 5 parts of zinc peroxide (containing 8 to 10% active oxygen) and 2 parts of xylene is gradually worked into the hot mixture. The composition is milled until it is homogeneous and substantially free of solvent, after which it is removed from the rolls in the form of sheets. Sheets heated in a press for 15 minutes at 160° C. are found to be no longer soluble in boiling toluene and to have a zero-strength temperature of 170° C. to 200° C. Sheets similarly heated in the absence of zinc peroxide are soluble in hot toluene and have a zero-strength temperature of 95° to 100° C. Likewise, no curing is obtained by heating in the absence of zinc peroxide or stearic acid.

Example II

Ten parts of sodium percarbonate (containing 14 to 15% active oxygen) is milled into 100 parts of the ethylene polymer of Example I on rolls heated at 100° to 120° C. Thereafter, there is added 2 parts of stearic acid and the mixture homogenized. The composition is removed from the rolls in the form of sheets. The sheets are heated in a press for 15 minutes at 160° C. The sheets thus obtained are insoluble in boiling toluene and have a zero-strength temperature of 190° to 200° C. A porous product is obtained by heating the uncured film in an oven for 15 minutes at 160° C. The porous film thus made is pliable, resilient, insoluble in boiling toluene and form-stable at temperatures above the melting point of the ethylene polymer (i. e. above 100° C.).

Example III

One hundred parts of an ethylene/vinyl acetate polymer having a mole ratio of ethylene to vinyl acetate of 2.3 to 1, 10 parts of stearic acid and 5 parts of zinc peroxide are compounded, as described in Example II, on rolls maintained between 20° and 50° C. The homogenized composition is removed from the rolls in sheet form and cured in a press for 15 minutes at 160° C. The cured product is insoluble in boiling toluene and has a zero-strength temperature of 152° C. Before curing the material is soluble in toluene at room temperature and has a zero-strength tempera-

Example IV

One hundred parts of a chlorinated ethylene polymer containing 26% combined chlorine, is sheeted on rolls maintained at 100–120° C. Ten parts of stearic acid and 5 parts of zinc peroxide are milled into the polymer as described in Example I. The blended composition is removed from the rolls and cured for 15 minutes in an oven heated to 160° C. The cured product is insoluble in boiling toluene, which is an excellent solvent for uncured chlorinated polyethylenes.

Example V

One hundred parts of a copolymer of ethylene, carbon monoxide and a minor amount of propylene, that contains 44% CO and has an intrinsic viscosity of 0.92 (0.1 gr. polymer in 100 cc. $CHCl_3$ at 20° C.), 10 parts of stearic acid and 5 parts of zinc peroxide are compounded as described in Example III. When cured for 15 minutes at 160° C., the compounded product is no longer soluble in chloroform which is a good solvent for the uncured polymer.

As previously indicated, the ethylene polymers used in the present process include those obtained from ethylene alone or from a polymerizable mixture in which ethylene is the major constituent. When the ethylene is admixed with other polymerizable constituents these latter are organic compounds containing, as the sole carbon to carbon unsaturation, one and only one ethylenic double bond and in which the ethylene constituent is present in substantial or in major proportion. Examples of such compounds include propylene, butylenes, vinyl acetate, vinyl chloroacetate, vinyl chloride, vinyl fluoride, vinylbutyl ether, vinyl ethyl ketone, vinylidene fluoride, tetrafluoroethylene, methacrylic and acrylic acids, their esters, amides and nitriles, butenedioic acid esters such as diethyl maleate, diethyl fumarate, etc.

Examples of monocarboxylic acids, in addition to stearic acid, which are useful in the practice of this invention, are butyric acid, valeric acid, caproic acid, heptoic acid, pelargonic acid, capric acid, undecelenic acid, undecyclic acid, lauric acid, myristic acid, margaric acid, arachidic acid, ricinoleic acid, oleic acid, palmitoleic acid, suberic acid, brassydic acid, japanic acid, behenic acid, cerotic acid, melissic acid, and the like. The acids most advantageously used for the present purpose are those which are substantially non-volatile at 120° C., i. e., the acids containing from 7 to 20 carbon atoms.

The amount of monocarboxylic acid used can range from 0.2 to 30% by weight, depending on the amount of peroxy compound employed, and is preferably from 5 to 10% by weight of the ethylene polymer.

The amount of peroxy compound can range from 1 to 20% and is preferably from 5 to 10% by weight of the ethylene polymer.

Curing of the compounded composition can be effected at temperatures of at least 100° C. up to 250° C., the best results being obtained in the range of 140° C. to 160° C.

The time required to effect the cure depends upon the temperature employed. Generally, at temperatures in the range of 140° to 160° C. the time will vary from 1 to 15 minutes. If lower temperatures are used longer heating periods are necessary.

The monocarboxylic acid and the inorganic peroxy compound may be incorporated into the ethylene polymer by any method which will produce a homogeneous blend. A convenient and practical way is by milling, but if desired, the components may be blended in the form of solutions or dispersions. After blending the solvent or dispersing medium is removed by means well known to the art.

The process described herein provides a simple, practical and economical method of curing the essentially saturated ethylene polymers, thereby enhancing their utility in a variety of products, such as, molded articles, fibers, films, protective coatings of all sorts, adhesives for metals, wood, fabrics, paper, and the like, abrasive compositions, gaskets, bungs, electrical insulation, bottle cap closures, collapsible containers, fuel pump diaphragms, etc. This invention is particularly well adapted to injection-molding techniques, because the compounded, uncured polyethylenes can be injected into a mold at temperatures below those at which they become insoluble and higher-melting. The molded objects can then be cured in the mold, or they can be removed and cured in an oven.

As many apparently widely different embodiments of this invention may be made without departing from the spirit and scope thereof, it is to be understood that I do not limit myself to the specific embodiments thereof except as defined in the appended claims.

I claim:

1. A method for curing an essentially saturated ethylene polymer which comprises forming a homogeneous blend of said polymer with from 1% to 20% by weight of said polymer of an inorganic peroxy compound and from 0.2% to 30% by weight of said polymer of a monocarboxylic acid having at least four carbon atoms, and heating said blend to a temperature of from 100° C. to 250° C. until said polymer becomes insoluble in organic solvents in which it was initially soluble, said inorganic peroxide being selected from the group consisting of sodium percarbonate and the basic peroxide hydrates of zinc and cadmium.

2. A method for curing an essentially saturated ethylene polymer which comprises milling with said polymer from 0.2% to 30% of its weight of a saturated monocarboxylic acid having at least four carbon atoms, then adding from 1% to 20% of the weight of said polymer of an inorganic peroxy compound, and continuing the milling until a homogeneous blend of said polymer, acid, and peroxy compound is obtained, and then heating said blend to a temperature of from 100° C. to 250° C. until it becomes insoluble in organic solvents in which the polymer was initially soluble, said inorganic peroxide being selected from the group consisting of sodium percarbonate and the basic peroxide hydrates of zinc and cadmium.

3. The process set forth in claim 1, in which said acid is stearic acid.

4. The process set forth in claim 1, in which the basic peroxide hydrate is zinc peroxide.

5. The process set forth in claim 1, in which the perhydrate is sodium percarbonate.

6. The process set forth in claim 1, in which said acid is stearic acid and in which the basic peroxide hydrate is zinc peroxide.

7. The process set forth in claim 1, in which said acid is stearic acid and in which the perhydrate is sodium percarbonate.

8. The process set forth in claim 2, in which said acid is stearic acid and in which the basic peroxide hydrate is zinc peroxide.

9. The process set forth in claim 2, in which said acid is stearic acid and in which the perhydrate is sodium percarbonate.

10. The process set forth in claim 1 in which said peroxy compound and said monocarboxylic acid are present in amount of from 5% to 10% by weight of said ethylene polymer.

WITTY LYSLE ALDERSON, Jr.

REFERENCES CITED

The following references are of record in the file of this patent:

UNITED STATES PATENTS

| Number | Name | Date |
|---|---|---|
| 2,334,996 | Davis | Nov. 23, 1943 |
| 2,360,673 | Hanford | Oct. 17, 1944 |